United States Patent
Foose et al.

(10) Patent No.: US 12,503,136 B2
(45) Date of Patent: Dec. 23, 2025

(54) SYSTEM AND METHOD FOR AUTOMATED VEHICLE ROUTING INTO PROTECTED LANES

(71) Applicant: GM Global Technology Operations LLC, Detroit, MI (US)

(72) Inventors: Dylan M. Foose, Madison Heights, MI (US); Jason R. Ekelmann, Royal Oak, MI (US); Connor Alexander Tagg, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 18/615,329

(22) Filed: Mar. 25, 2024

(65) Prior Publication Data
US 2025/0296597 A1    Sep. 25, 2025

(51) Int. Cl.
*B60W 60/00* (2020.01)
*B60W 40/10* (2012.01)
*B60W 50/08* (2020.01)
*G06Q 50/40* (2024.01)

(52) U.S. Cl.
CPC .......... *B60W 60/001* (2020.02); *B60W 40/10* (2013.01); *B60W 50/08* (2013.01); *G06Q 50/40* (2024.01); *B60W 2420/403* (2013.01); *B60W 2420/408* (2024.01); *B60W 2540/049* (2020.02); *B60W 2555/60* (2020.02); *G06Q 2240/00* (2013.01)

(58) Field of Classification Search
None
See application file for complete search history.

(56) References Cited

U.S. PATENT DOCUMENTS

| | | | |
|---|---|---|---|
| 11,136,037 B2 * | 10/2021 | Saikyo | B60Q 9/00 |
| 11,308,316 B1 * | 4/2022 | Ali | G06V 10/34 |
| 2009/0115638 A1 * | 5/2009 | Shankwitz | G08G 1/0104 |
| | | | 340/988 |
| 2010/0274473 A1 * | 10/2010 | Konishi | G01C 21/3697 |
| | | | 701/532 |
| 2012/0179361 A1 * | 7/2012 | Mineta | G01C 21/3469 |
| | | | 701/410 |
| 2014/0032098 A1 * | 1/2014 | Anderson | B60N 2/0025 |
| | | | 701/428 |

(Continued)

FOREIGN PATENT DOCUMENTS

| | | |
|---|---|---|
| DE | 102019001034 A1 | 8/2019 |
| DE | 102022001715 A1 | 6/2022 |

(Continued)

*Primary Examiner* — Jonathan M Dager
(74) *Attorney, Agent, or Firm* — Vivacqua Crane, PLLC

(57) ABSTRACT

A method for initiating automated path planning into a protected lane for a vehicle includes determining a restriction status of the protected lane. The method further may include determining an occupancy status of the vehicle. The method further may include determining a towing status of the vehicle. The method further may include determining a toll status of the vehicle. The method further may include initiating automated path planning into the protected lane based at least in part on the restriction status of the protected lane, the occupancy status of the vehicle, the towing status of the vehicle, and the toll status of the vehicle.

20 Claims, 5 Drawing Sheets

(56) References Cited

U.S. PATENT DOCUMENTS

| | | | | |
|---|---|---|---|---|
| 2014/0188376 | A1* | 7/2014 | Gordon | G08G 1/09 |
| | | | | 701/119 |
| 2015/0294168 | A1* | 10/2015 | Artan | G06F 18/214 |
| | | | | 382/104 |
| 2016/0307441 | A1* | 10/2016 | Wieskamp | G08G 1/09626 |
| 2018/0022346 | A1 | 1/2018 | Murakami | |
| 2018/0143033 | A1* | 5/2018 | Hu | G01C 21/3617 |
| 2019/0001836 | A1* | 1/2019 | Payne | B60W 20/13 |
| 2019/0050654 | A1* | 2/2019 | Payne-Short | G06N 3/0464 |
| 2019/0213576 | A1* | 7/2019 | Borras | G06Q 20/3224 |
| 2019/0265059 | A1* | 8/2019 | Warnick | G05D 1/0291 |
| 2019/0272742 | A1* | 9/2019 | Ioli | G08G 1/0116 |
| 2019/0325747 | A1* | 10/2019 | Fleming | G01C 21/3484 |
| 2020/0334920 | A1* | 10/2020 | London | G06Q 30/0284 |
| 2021/0183169 | A1* | 6/2021 | Borras | G01S 19/14 |
| 2022/0205799 | A1* | 6/2022 | Radakovic | G08G 1/096816 |
| 2022/0223036 | A1* | 7/2022 | Chikamori | G01C 21/3461 |
| 2023/0194295 | A1* | 6/2023 | Nayak | G01C 21/3461 |
| 2023/0342456 | A1* | 10/2023 | Ansari | G06F 21/602 |
| 2023/0415761 | A1* | 12/2023 | Sura | B60W 50/0205 |
| 2025/0189334 | A1* | 6/2025 | Lal | G01C 21/3461 |

FOREIGN PATENT DOCUMENTS

| | | |
|---|---|---|
| DE | 102021001674 A1 | 10/2022 |
| DE | 102022206360 A1 | 1/2024 |

* cited by examiner

SYSTEM AND METHOD FOR AUTOMATED VEHICLE ROUTING INTO PROTECTED LANES

INTRODUCTION

The present disclosure relates to advanced driver assistance and automated driving systems and methods for vehicles, and more particularly, to systems and methods for path planning for a vehicle.

To increase occupant awareness and convenience, vehicles may be equipped with advanced driver assistance systems (ADAS) and/or automated driving systems (ADS). ADAS systems may use various sensors such as cameras, radar, and LiDAR (light detection and ranging) to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. ADS systems may use various sensors to detect objects in the environment around the vehicle and control the vehicle to navigate the vehicle through the environment to a predetermined destination. However, current ADAS and ADS systems may not account for protected lanes (e.g., high occupancy vehicle (HOV) lanes), and thus may not effectively use protected lanes to routing.

Thus, while ADAS and ADS systems and methods achieve their intended purpose, there is a need for a new and improved system and method for initiating automated path planning into a protected lane for a vehicle.

SUMMARY

According to several aspects, a method for initiating automated path planning into a protected lane for a vehicle is provided. The method may include determining a restriction status of the protected lane. The method further may include determining an occupancy status of the vehicle. The method further may include determining a towing status of the vehicle. The method further may include determining a toll status of the vehicle. The method further may include initiating automated path planning into the protected lane based at least in part on the restriction status of the protected lane, the occupancy status of the vehicle, the towing status of the vehicle, and the toll status of the vehicle.

In another aspect of the present disclosure, determining the restriction status of the protected lane further may include capturing an image of a protected lane status indicator using a vehicle camera. Determining the restriction status of the protected lane further may include determining the restriction status of the protected lane based at least in part on the image.

In another aspect of the present disclosure, determining the occupancy status of the vehicle further may include determining the occupancy status of the vehicle based at least in part on at least one of: a seat belt sensor measurement, a seat weight sensor measurement, and a door sensor measurement. The occupancy status includes one of: a high occupancy status and a low occupancy status.

In another aspect of the present disclosure, determining the occupancy status of the vehicle further may include performing the seat belt sensor measurement. Determining the occupancy status of the vehicle further may include determining a quantity of seat belts engaged based at least in part on the seat belt sensor measurement. Determining the occupancy status of the vehicle further may include determining the occupancy status to be the low occupancy status in response to determining that the quantity of seat belts engaged is less than a predetermined seat belt threshold.

In another aspect of the present disclosure, determining the occupancy status of the vehicle further may include performing the seat weight sensor measurement in response to determining that the quantity of seat belts engaged is greater than or equal to the predetermined seat belt threshold. Determining the occupancy status of the vehicle further may include determining a quantity of occupied seats based at least in part on the seat weight sensor measurement. Determining the occupancy status of the vehicle further may include determining the occupancy status to be the low occupancy status in response to determining that the quantity of seat belts engaged is not equal to the quantity of occupied seats.

In another aspect of the present disclosure, determining the occupancy status of the vehicle further may include performing the door sensor measurement in response to determining that the quantity of seat belts engaged is greater than or equal to the predetermined seat belt threshold and that the quantity of seat belts engaged is equal to the quantity of occupied seats. Determining the occupancy status of the vehicle further may include determining a quantity of door opening events based at least in part on the door sensor measurement. Determining the occupancy status of the vehicle further may include requesting an occupant response in response to determining that the quantity of seat belts engaged is not equal to the quantity of occupied seats and the quantity of door opening events. Determining the occupancy status of the vehicle further may include determining the occupancy status based at least in part on the occupant response. Determining the occupancy status of the vehicle further may include determining the occupancy status to be the high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

In another aspect of the present disclosure, determining the towing status of the vehicle further may include determining a connection status of a vehicle trailer connector. The connection status includes one of: a trailer connected status and a trailer disconnected status. Determining the towing status of the vehicle further may include determining the towing status to be an active towing status in response to determining that the connection status is the trailer connected status. Determining the towing status of the vehicle further may include determining the towing status to be an inactive towing status in response to determining that the connection status is the trailer disconnected status.

In another aspect of the present disclosure, determining the toll status of the vehicle further may include establishing a connection to a mobile device. Determining the toll status of the vehicle further may include determining a toll account registration status using the connection to the mobile device. The toll account registration status includes one of: a toll account registered status and a toll account unregistered status. Determining the toll status of the vehicle further may include determining the toll status to be a toll denied status in response to determining that the toll account registration status is the toll account unregistered status.

In another aspect of the present disclosure, determining the toll status of the vehicle further may include determining an occupant toll preference using the connection to the mobile device in response to determining that the toll account registration status is the toll account registered status. The occupant toll preference includes one of: a negative occupant toll preference and a positive occupant toll preference. Determining the toll status of the vehicle further may include determining the toll status to be the toll denied status in response to determining that the occupant toll preference is the negative occupant toll preference. Determining the toll status of the vehicle further may include determining the toll status to be a toll approved status in response to determining that the occupant toll preference is the positive occupant toll preference.

In another aspect of the present disclosure, determining the toll status of the vehicle further may include establishing a connection to a toll transponder device. Determining the toll status of the vehicle further may include determining a toll account registration status using the connection to the toll transponder device. The toll account registration status includes one of: a toll account registered status and a toll account unregistered status. Determining the toll status of the vehicle further may include determining the toll status to be a toll denied status in response to determining that the toll account registration status is the toll account unregistered status. Determining the toll status of the vehicle further may include determining the toll status to be a toll approved status in response to determining that the toll account registration status is the toll account registered status.

According to several aspects, a system for initiating automated path planning into a protected lane for a vehicle is provided. The system may include a perception sensor, an occupancy sensor, an automated driving system, a vehicle communication system, and a vehicle controller in electrical communication with the perception sensor, the occupancy sensor, the automated driving system, and the vehicle communication system. The vehicle controller is programmed to determine a restriction status of the protected lane using the perception sensor. The vehicle controller is further programmed to determine an occupancy status of the vehicle using the occupancy sensor. The vehicle controller is further programmed to determine a toll status of the vehicle using the vehicle communication system. The vehicle controller is further programmed to initiate automated path planning into the protected lane using the automated driving system based at least in part on the restriction status of the protected lane, the occupancy status of the vehicle, and the toll status of the vehicle.

In another aspect of the present disclosure, the perception sensor further may include a vehicle camera. To determine a restriction status of the protected lane, the vehicle controller is further programmed to capture an image of a protected lane status indicator using the vehicle camera. To determine a restriction status of the protected lane, the vehicle controller is further programmed to determine the restriction status of the protected lane based at least in part on the image.

In another aspect of the present disclosure, the occupancy sensor further may include a seat belt sensor. To determine the occupancy status of the vehicle, the vehicle controller is further programmed to perform a seat belt sensor measurement using the seat belt sensor. The seat belt sensor measurement includes an engagement status of each of a plurality of seat belts of the vehicle. To determine the occupancy status of the vehicle, the vehicle controller is further programmed to determine a quantity of seat belts engaged based at least in part on the engagement status of each of the plurality of seat belts of the vehicle. To determine the occupancy status of the vehicle, the vehicle controller is further programmed to determine the occupancy status to be a low occupancy status in response to determining that the quantity of seat belts engaged is less than a predetermined seat belt threshold.

In another aspect of the present disclosure, the occupancy sensor further may include a seat weight sensor. To determine the occupancy status of the vehicle, the vehicle controller is further programmed to perform a seat weight sensor measurement using the seat weight sensor in response to determining that the quantity of seat belts engaged is greater than or equal to the predetermined seat belt threshold. To determine the occupancy status of the vehicle, the vehicle controller is further programmed to determine a quantity of occupied seats based at least in part on the seat weight sensor measurement. To determine the occupancy status of the vehicle, the vehicle controller is further programmed to determine the occupancy status to be the low occupancy status in response to determining that the quantity of seat belts engaged is not equal to the quantity of occupied seats.

In another aspect of the present disclosure, the occupancy sensor further may include a door sensor. To determine the occupancy status of the vehicle, the vehicle controller is further programmed to perform a door sensor measurement using the door sensor in response to determining that the quantity of seat belts engaged is greater than or equal to the predetermined seat belt threshold and that the quantity of seat belts engaged is equal to the quantity of occupied seats. To determine the occupancy status of the vehicle, the vehicle controller is further programmed to determine a quantity of door opening events based at least in part on the door sensor measurement. To determine the occupancy status of the vehicle, the vehicle controller is further programmed to request an occupant response in response to determining that the quantity of seat belts engaged is not equal to the quantity of occupied seats and the quantity of door opening events. To determine the occupancy status of the vehicle, the vehicle controller is further programmed to determine the occupancy status based at least in part on the occupant response. To determine the occupancy status of the vehicle, the vehicle controller is further programmed to determine the occupancy status to be a high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

In another aspect of the present disclosure, to determine the toll status of the vehicle, the vehicle controller is further programmed to establish a connection to a mobile device using the vehicle communication system. To determine the toll status of the vehicle, the vehicle controller is further programmed to determine a toll account registration status using the connection to the mobile device. The toll account registration status includes one of: a toll account registered status and a toll account unregistered status. To determine the toll status of the vehicle, the vehicle controller is further programmed to determine the toll status to be a toll denied status in response to determining that the toll account registration status is the toll account unregistered status. To determine the toll status of the vehicle, the vehicle controller is further programmed to determine an occupant toll preference using the connection to the mobile device in response to determining that the toll account registration status is the toll account registered status. The occupant toll preference includes one of: a negative occupant toll preference and a positive occupant toll preference. To determine the toll status of the vehicle, the vehicle controller is further programmed to determine the toll status to be the toll denied status in response to determining that the occupant toll preference is the negative occupant toll preference. To determine the toll status of the vehicle, the vehicle controller is further programmed to determine the toll status to be a toll approved status in response to determining that the occupant toll preference is the positive occupant toll preference.

In another aspect of the present disclosure, to initiate automated path planning into the protected lane, the vehicle controller is further configured to compare the restriction status of the protected lane to the occupancy status of the vehicle and the toll status of the vehicle. To initiate automated path planning into the protected lane, the vehicle controller is further configured to calculate an automated vehicle path including the protected lane using the automated driving system in response to determining that the occupancy status of the vehicle and the toll status of the vehicle satisfy the restriction status of the protected lane.

According to several aspects, a method for initiating automated path planning into a protected lane for a vehicle is provided. The method may include capturing an image of a protected lane status indicator using a vehicle camera. The method further may include determining a restriction status of the protected lane based at least in part on the image. The method further may include determining an occupancy status of the vehicle based at least in part on at least one of: a seat belt sensor measurement, a seat weight sensor measurement, and a door sensor measurement. The occupancy status includes one of: a high occupancy status and a low occupancy status. The method further may include determining a towing status of the vehicle based at least in part on a connection status of a vehicle trailer connector. The connection status includes one of: a trailer connected status and a trailer disconnected status. The method further may include determining a toll status of the vehicle based at least in part on a connection to at least one of: a mobile device and a toll transponder device. The toll status includes one of: a toll approved status and a toll denied status. The method further may include comparing the restriction status of the protected lane to the occupancy status of the vehicle, the towing status of the vehicle, and the toll status of the vehicle. The method further may include calculating an automated vehicle path including the protected lane in response to determining that the occupancy status of the vehicle, the towing status of the vehicle, and the toll status of the vehicle satisfy the restriction status of the protected lane.

In another aspect of the present disclosure, determining the occupancy status of the vehicle further may include performing the seat belt sensor measurement. Determining the occupancy status of the vehicle further may include determining a quantity of seat belts engaged based at least in part on the seat belt sensor measurement. Determining the occupancy status of the vehicle further may include determining the occupancy status to be the low occupancy status in response to determining that the quantity of seat belts engaged is less than a predetermined seat belt threshold. Determining the occupancy status of the vehicle further may include performing the seat weight sensor measurement in response to determining that the quantity of seat belts engaged is greater than or equal to the predetermined seat belt threshold. Determining the occupancy status of the vehicle further may include determining a quantity of occupied seats based at least in part on the seat weight sensor measurement. Determining the occupancy status of the vehicle further may include determining the occupancy status to be the low occupancy status in response to determining that the quantity of seat belts engaged is not equal to the quantity of occupied seats.

In another aspect of the present disclosure, determining the occupancy status of the vehicle further may include performing the door sensor measurement in response to determining that the quantity of seat belts engaged is greater than or equal to the predetermined seat belt threshold and that the quantity of seat belts engaged is equal to the quantity of occupied seats. Determining the occupancy status of the vehicle further may include determining a quantity of door opening events based at least in part on the door sensor measurement. Determining the occupancy status of the vehicle further may include requesting an occupant response in response to determining that the quantity of seat belts engaged is not equal to the quantity of occupied seats and the quantity of door opening events. Determining the occupancy status of the vehicle further may include determining the occupancy status based at least in part on the occupant response. Determining the occupancy status of the vehicle further may include determining the occupancy status to be the high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, protected lanes, including, for example high occupancy vehicle (HOV) lanes, may be provided on roadways for the purpose of increasing traffic efficiency. Protected lanes may have various restrictions stipulating which vehicles may utilize the protected lane. Restrictions may also vary based on traffic load, time of day, and/or the like. Therefore, the present disclosure provides a new and improved system and method for initiating automated path planning into a protected lane for a vehicle.

Figure 1:
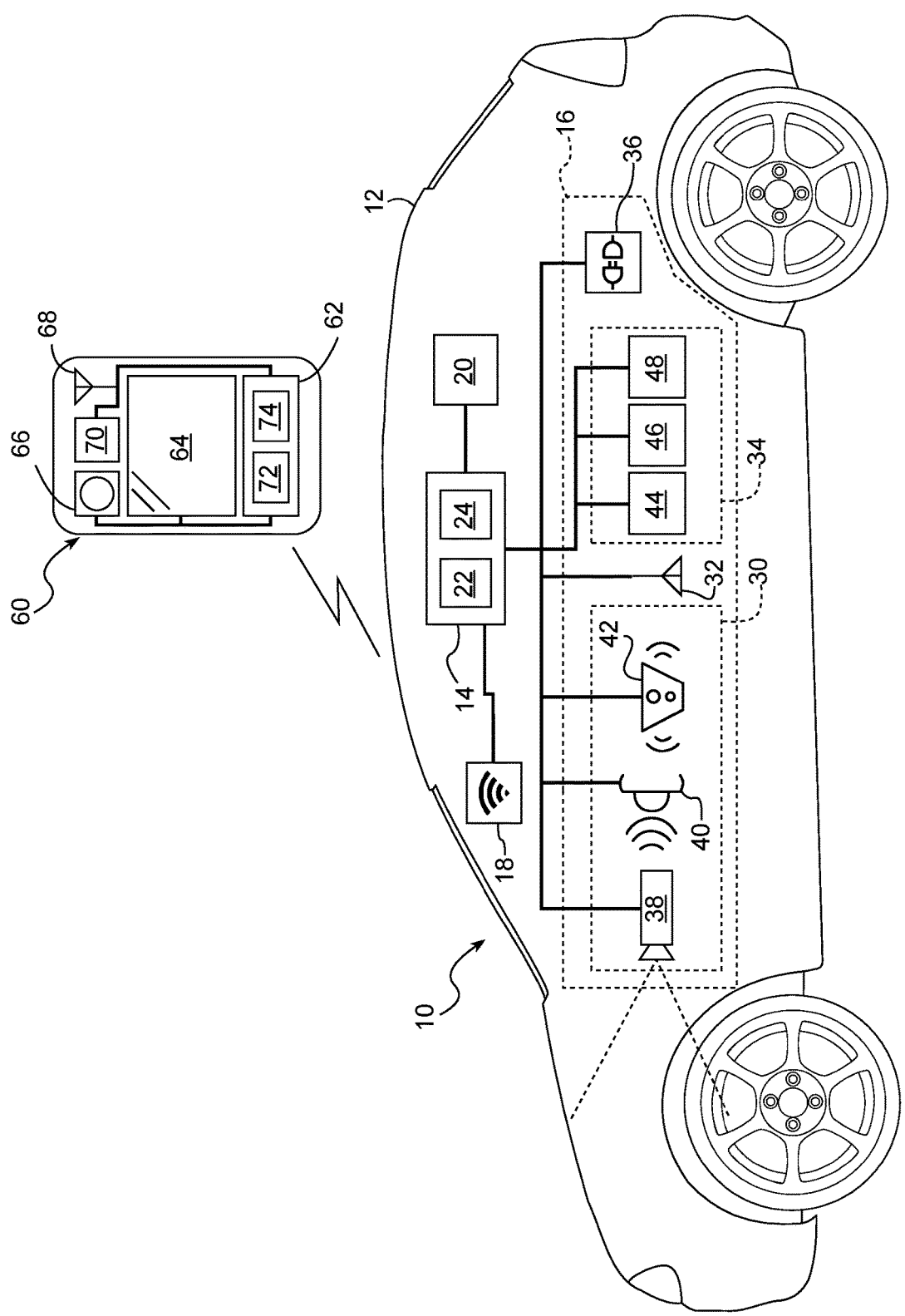
FIG. 1 is a schematic diagram of a system for initiating automated path planning into a protected lane for a vehicle, according to an exemplary embodiment.

Referring to FIG. 1, a system for initiating automated path planning into a protected lane for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a plurality of vehicle sensors 16, a toll transponder device 18, and an automated driving system 20.

The vehicle controller 14 is used to implement a method 100 for initiating automated path planning into a protected lane for a vehicle, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions.

The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other.

The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with plurality of vehicle sensors 16, the toll transponder device 18, and the automated driving system 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The plurality of vehicle sensors 16 are used to acquire information relevant to the vehicle 12. In an exemplary embodiment, the plurality of vehicle sensors 16 includes a perception sensor 30, a vehicle communication system 32, an occupancy sensor 34, and a vehicle trailer connector 36.

The perception sensor 30 is used to perceive objects and/or measure distances in the environment surrounding the vehicle 12. In an exemplary embodiment, the perception sensor 30 includes at least one of: a vehicle camera 38, a radar sensor 40, and a light detection and ranging (LiDAR) sensor 42.

The vehicle camera 38 is used to capture images and/or videos of the environment surrounding the vehicle 12. In an exemplary embodiment, the vehicle camera 38 includes a photo and/or video camera which is positioned to view the environment surrounding the vehicle 12. In a non-limiting example, the vehicle camera 38 includes a camera affixed inside of the vehicle 12, for example, in a headliner of the vehicle 12, having a view through the windscreen. In another non-limiting example, the vehicle camera 38 includes a camera affixed outside of the vehicle 12, for example, on a roof of the vehicle 12, having a view of the environment in front of the vehicle 12.

In another exemplary embodiment, the vehicle camera 38 is a surround view camera system including a plurality of cameras (also known as satellite cameras) arranged to provide a view of the environment adjacent to all sides of the vehicle 12. In a non-limiting example, the vehicle camera 38 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the vehicle camera 38 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The radar sensor 40 is used to detect and measure the distance, speed, and direction of objects by emitting radio waves and analyzing reflections of the radio waves. In an exemplary embodiment, the radar sensor 40 includes a radar transmitter, a radar antenna, a radar receiver, and a radar signal processing unit. In a non-limiting example, the radar transmitter emits radio frequency (RF) signals, which travel through space until they encounter an object. The RF signals bounce off the object's surface, return to the radar sensor 40. The radar receiver captures the reflected signals, and the radar signal processing unit analyzes the time delay, frequency shift, and amplitude of the returned RF signals to determine the distance, speed, and direction of the detected objects. The radar sensor 40 is in electrical communication with the vehicle controller 14, as discussed above.

The LiDAR sensor 42 is utilized for remote sensing and environmental mapping by emitting laser pulses and measuring the time it takes for the laser pulses to return to the LiDAR sensor 42 after hitting objects. In an exemplary embodiment, the LiDAR sensor 42 includes a LIDAR laser source, a LiDAR scanner or mirror, a LIDAR photodetector, and a LIDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 42 is in electrical communication with the vehicle controller 14, as discussed above.

In another exemplary embodiment, the perception sensor 30 further includes a stereoscopic camera having distance measurement capabilities. In one example, the perception sensor 30 is affixed inside of the vehicle 12, for example, in a headliner of the vehicle 12, having a view through a windscreen of the vehicle 12. In another example, the perception sensor 30 is affixed outside of the vehicle 12, for example, on a roof of the vehicle 12, having a view of the environment surrounding the vehicle 12. It should be understood that various additional types of perception sensors, such as, for example, ultrasonic ranging sensors and/or time-of-flight sensors are within the scope of the present disclosure. The perception sensor 30 is in electrical communication with the vehicle controller 14 as discussed above.

The vehicle communication system 32 is used by the vehicle controller 14 to communicate with other systems external to the vehicle 12. For example, the vehicle communication system 32 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 32 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like).

Accordingly, the vehicle communication system 32 may further include an embedded universal integrated circuit card (eUICC) configured to store at least one cellular connectivity configuration profile, for example, an embedded subscriber identity module (eSIM) profile. The vehicle communication system 32 is further configured to communicate via a personal area network (e.g., BLUETOOTH), near-field communication (NFC), and/or any additional type of radiofrequency communication. However, additional, or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system 32 may include one or more antennas and/or communication transceivers for receiving and/or transmitting signals, such as cooperative sensing messages (CSMs). The vehicle communication system 32 is configured to wirelessly communicate information between the vehicle 12 and another vehicle. Further, the vehicle communication system 32 is configured to wirelessly communicate information between the vehicle 12 and infrastructure or other vehicles. It should be understood that the vehicle communication system 32 may be integrated with the vehicle controller 14 (e.g., on a same circuit board with the vehicle controller 14 or otherwise a part of the vehicle controller 14) without departing from the scope of the present disclosure. The vehicle communication system 32 is in electrical communication with the vehicle controller 14 as discussed above.

The occupancy sensor 34 is used to determine a quantity and/or seating location of occupants in the vehicle 12. In the scope of the present disclosure, the occupant includes, in a non-limiting example, a driver, a passenger, and/or any additional persons in the vehicle 12. In an exemplary embodiment, the occupancy sensor 34 includes a seat belt sensor 44, a seat weight sensor 46, and a door sensor 48.

The seat belt sensor 44 is used to determine an engagement status of each of a plurality of seat belts (not shown) of the vehicle 12. In an exemplary embodiment, each of the plurality of seat belts includes a tongue and a buckle. In the scope of the present disclosure, the engagement status of each of the plurality of seat belts of the vehicle 12 includes an engaged status and a disengaged status. The engaged status indicates that the tongue is engaged with (i.e., connected to) the buckle, which may be an indication of a presence of an occupant using the seat belt. The disengaged status indicates that the tongue is not engaged with (i.e., connected to) the buckle. In an exemplary embodiment, the seat belt sensor 44 includes an electromechanical switch disposed within the buckle and actuated when the tongue is positively engaged with the buckle. In another exemplary embodiment, the seat belt sensor 44 includes a Hall Effect sensor disposed within the buckle and a magnet disposed within the tongue. The Hall Effect sensor detects a presence of a magnetic field produced by the magnet, indicating that the tongue is engaged with the buckle. It should be understood that the seat belt sensor 44 may include a plurality of seat belt sensors, each of the plurality of seat belt sensors configured to determine the engagement status of one of the plurality of seat belts. It should further be understood that any electrical and/or electromechanical system for detecting the engagement status of each of the plurality of seat belts is within the scope of the present disclosure. The seat belt sensor 44 is in electrical communication with the vehicle controller 14 as discussed above.

The seat weight sensor 46 is used to determine a quantity of occupied seats of the vehicle 12. In an exemplary embodiment, the seat weight sensor 46 includes pressure-sensitive elements embedded within a seat cushion or seat frame and signal processing electronics. In a non-limiting example, the pressure-sensitive elements include strain gauges, piezoelectric sensors, capacitive sensors, and/or the like. The seat weight sensor 46 functions by measuring the pressure exerted on the seat surface by occupants sitting in the seat and/or objects placed on the seat. When an occupant or object occupies the seat, their weight compresses the pressure-sensitive elements, generating a corresponding electrical signal. The signal processing electronics process the electrical signal to determine the presence and weight of the occupant or object. It should be understood that the seat weight sensor 46 may include a plurality of seat weight sensors, each of the plurality of seat weight sensors disposed within each of a plurality of seats of the vehicle 12. It should further be understood that any electrical and/or electromechanical system for detecting weight or pressure on vehicle seats is within the scope of the present disclosure. The seat weight sensor 46 is in electrical communication with the vehicle controller 14 as discussed above.

The door sensor 48 is used to detect door opening events for each of a plurality of doors of the vehicle 12. In the scope of the present disclosure, a door opening event includes a door of the vehicle 12 being opened and subsequently closed, which may indicate an occupant entering the vehicle 12. In an exemplary embodiment, a door latch sensor includes a magnetic switch, reed switch, momentary switch, and/or Hall Effect sensor integrated into a door latch mechanism and signal processing circuitry. In a non-limiting example, the door sensor 48 functions by detecting the position of the door latch mechanism. When the door is closed, the door latch mechanism engages with a door frame, causing the door sensor 48 to register a closed position. When the door is open, the door latch mechanism disengages from the door frame, causing the door sensor 48 to register an open position. It should be understood that the door sensor 48 may include a plurality of door sensors, each of the plurality of door sensors disposed within each of a plurality of doors of the vehicle 12. It should further be understood that any electrical and/or electromechanical system for detecting door opening is within the scope of the present disclosure. The door sensor 48 is in electrical communication with the vehicle controller 14 as discussed above.

In a non-limiting example, the door sensor 48 sends the registered position of the door to the vehicle controller 14. The vehicle controller 14 receives the registered position of the door and logs the registered position of the door over time in the media 24 of the vehicle controller 14. Therefore, the vehicle controller 14 may identify door opening events for one or more doors based on one or more registered door positions stored in the media 24.

The vehicle trailer connector 36 is used to provide electrical power to a trailer (not shown) towed by the vehicle 12. In an exemplary embodiment, the vehicle trailer connector 36 includes a housing with multiple conducting pins or sockets, each corresponding to specific electrical functions. The vehicle trailer connector 36 provides a standardized interface for connecting an electrical system of the vehicle 12 and an electrical system of the trailer. The conducting pins or sockets in the housing are wired to the corresponding electrical circuits in both the vehicle 12 and the trailer. When the vehicle trailer connector 36 is connected to a corresponding electrical connector of the trailer, electrical signals can pass between the vehicle 12 and the trailer, enabling the operation of electrical functions of the trailer, such as brake lights, turn signals, tail lights, reverse lights, electric brakes, and/or the like. It should be understood that any plug, socket, connector, or other electrical interface for connecting a vehicle electrical system to a trailer electrical system is within the scope of the present disclosure. The vehicle trailer connector 36 is in electrical communication with the vehicle controller 14 as discussed above.

In an exemplary embodiment, the vehicle trailer connector 36 is also used to determine a connection status. The connection status includes one of: a trailer connected status and a trailer disconnected status. In the scope of the present disclosure, the trailer connected status means that the trailer is electrically connected to the vehicle 12 and thus being towed by the vehicle 12. The trailer disconnected status means that no trailer is electrically connected to the vehicle 12, and thus that the vehicle 12 is not towing a trailer. In a non-limiting example, the vehicle controller 14 determines the connection status of the vehicle trailer connector 36 using an impedance or resistance measurement of the conducting pins or sockets, a continuity measurement between two or more of the conducting pins or sockets, a current measurement to detect a load current drawn by a connected trailer, and/or the like. It should be understood that additional methods for determining the connection status of the vehicle trailer connector 36 are within the scope of the present disclosure. It should further be understood that additional methods for detecting a towing status of the vehicle 12, including, for example, use of a mechanical strain gauge to detect a weight of a connected trailer, are also within the scope of the present disclosure.

In another exemplary embodiment, the plurality of vehicle sensors 16 further includes sensors to determine performance data about the vehicle 12. In a non-limiting example, the plurality of vehicle sensors 16 further includes a motor speed sensor, a motor torque sensor, an electric drive motor voltage and/or current sensor, an accelerator pedal position sensor, a brake position sensor, a coolant temperature sensor, a cooling fan speed sensor, a vehicle dynamics sensor (e.g., an accelerometer, a gyroscope, and/or a magnetometer), and a transmission oil temperature sensor.

In another exemplary embodiment, the plurality of vehicle sensors 16 further includes additional sensors to determine information about an environment within the vehicle 12. In a non-limiting example, the plurality of vehicle sensors 16 further includes a cabin air temperature sensor, a cabin motion detection sensor, a cabin camera, a cabin microphone, an occupant eye tracker, and/or the like.

In another exemplary embodiment, the plurality of vehicle sensors 16 further includes additional sensors to determine information about an environment surrounding the vehicle 12. In a non-limiting example, the plurality of vehicle sensors 16 further includes at least one of an ambient air temperature sensor, a barometric pressure sensor, and/or the like. The plurality of vehicle sensors 16 are in electrical communication with the vehicle controller 14 as discussed above.

The toll transponder device 18 is used as part of an electronic toll collection system to automate the payment of tolls on roadways. In an exemplary embodiment, the toll transponder device 18 includes a microcontroller (not shown), a power source (not shown), and one or more antennas (not shown). The toll transponder device 18 is disposed within the vehicle 12 (e.g., on or near a dashboard or windscreen of the vehicle 12) and configured to communicate with radio-frequency (RF) communication infrastructure at a toll collection point. In some examples, the toll transponder device 18 is further configured to communicate with a configuring device (e.g., a mobile device 60, as will be discussed in greater detail below). In an exemplary embodiment, the toll transponder device 18 is configured to communicate with the RF communication infrastructure and the configuring device using short and/or medium range RF communication techniques and protocols such as, for example, radio frequency identification (RFID), dedicated short-range communication (DSRC), near-field communication (NFC), personal area network communication (e.g., BLUETOOTH), and/or the like.

In a non-limiting example, when entering the vicinity of the toll collection point, the toll transponder device 18 establishes a connection with the RF communication infrastructure at the toll collection point and provides identifying information about the vehicle 12 such that a toll may be calculated and charged based on the passage of the vehicle 12 through the toll collection point. The configuring device may establish a connection with the toll transponder device 18 to configure the toll transponder device 18. In a non-limiting example, configuring the toll transponder device 18 includes upload of configuration properties (e.g., toll zone validity, time validity, vehicle size/type/weight, and/or the like) to the toll transponder device 18. The configuring device may also request status information from the toll transponder device 18 (e.g., battery level, device status, toll zone validity, time validity, and/or the like). The toll transponder device 18 is in electrical communication with the vehicle controller 14 as discussed above.

The automated driving system 20 is used to provide assistance to the occupant to increase occupant awareness and/or control behavior of the vehicle 12. In the scope of the present disclosure, the automated driving system 20 encompasses systems which provide any level of assistance to the occupant (e.g., blind spot warning, lane departure warning, and/or the like) and systems which are capable of autonomously driving the vehicle 12 under some or all conditions (e.g., automated lane keeping, adaptive cruise control, fully autonomous driving, and/or the like). It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 20 is configured to detect and/or receive information about the environment surrounding the vehicle 12 and process the information to provide assistance to the occupant. In some embodiments, the automated driving system 20 is a software module executed on the vehicle controller 14. In other embodiments, the automated driving system 20 includes a separate automated driving system controller, similar to the vehicle controller 14, capable of processing the information about the environment surrounding the vehicle 12. In an exemplary embodiment, the automated driving system 20 may operate in a manual operation mode, a partially automated operation mode, and a fully automated operation mode.

In the scope of the present disclosure, the manual operation mode means that the automated driving system 20 provides warnings or notifications to the occupant but does not intervene or control the vehicle 12 directly. In a non-limiting example, the automated driving system 20 receives information from the plurality of vehicle sensors 16. Using techniques such as, for example, computer vision, the automated driving system 20 understands the environment surrounding the vehicle 12 and provides assistance to the occupant. For example, if the automated driving system 20 identifies, based on data from the plurality of vehicle sensors 16, that the vehicle 12 is likely to collide with a remote vehicle, the automated driving system 20 may use a display to provide a warning to the occupant.

In the scope of the present disclosure, the partially automated operation mode means that the automated driving system 20 provides warnings or notifications to the occupant and may intervene or control the vehicle 12 directly in certain situations. In a non-limiting example, the automated driving system 20 is additionally in electrical communication with components of the vehicle 12 such as a brake system, a propulsion system, and/or a steering system of the vehicle 12, such that the automated driving system 20 may control the behavior of the vehicle 12. In a non-limiting example, the automated driving system 20 may control the behavior of the vehicle 12 by applying brakes of the vehicle 12 to avoid an imminent collision. In another non-limiting example, the automated driving system 20 may control the steering system of the vehicle 12 to provide an automated lane keeping feature and/or an automated lane change feature. In another non-limiting example, the automated driving system 20 may control the brake system, propulsion system, and steering system of the vehicle 12 to temporarily drive the vehicle 12 towards a predetermined destination. However, intervention by the occupant may be required at any time. In an exemplary embodiment, the automated driving system 20 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 20 uses data from the plurality of vehicle sensors 16 to understand the environment and control the vehicle 12 to drive the vehicle 12 to a predetermined destination without a need for control or intervention by the occupant.

The automated driving system 20 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the plurality of vehicle sensors 16. In another exemplary embodiment, the path planning algorithm is a deterministic algorithm which has been programmed to output control signals for the vehicle 12 based on data collected from the plurality of vehicle sensors 16.

In a non-limiting example, the path planning algorithm generates a sequence of waypoints or a continuous path that the vehicle 12 should follow to reach a destination while adhering to rules, regulations, and safety constraints. The sequence of waypoints or continuous path is generated based at least in part on a detailed map and a current state of the vehicle 12 (i.e., position, velocity, and orientation of the vehicle 12). The detailed map includes, for example, information about lane boundaries, road geometry, speed limits, traffic signs, and/or other relevant features. In an exemplary embodiment, the detailed map is stored in the media 24 of the vehicle controller 14 and/or on a remote database or server. In another exemplary embodiment, the path planning algorithm performs perception and mapping tasks to interpret data collected from the plurality of vehicle sensors 16 and create, update, and/or augment the detailed map.

In some embodiments, the sequence of waypoints or continuous path is further generated based at least in part on route characteristic restrictions. In the scope of the present disclosure, route characteristic restrictions include additional constraints or preferences about route characteristics. In a non-limiting example, route characteristic restrictions may include, for example, "avoid tolls", "avoid highways", "prefer shortest route", "prefer fastest route", and/or the like. Route characteristic restrictions may be predetermined and stored locally or dynamically updated.

It should be understood that the automated driving system 20 may include any software and/or hardware module configured to operate in the manual operation mode, the partially automated operation mode, or the fully automated operation mode as described above. The automated driving system is in electrical communication with the vehicle controller 14 as discussed above.

With continued reference to FIG. 1, the mobile device 60 is in wireless communication with the system 10. While the mobile device 60 is depicted as a smartphone in FIG. 1, it should be understood that additional mobile devices, such as, for example, tablets, fitness trackers, smart wearable devices, and the like are within the scope of the present disclosure.

The mobile device 60 includes a mobile device controller 62, a mobile device display 64, a mobile device camera 66, a mobile device communication system 68, and mobile device sensors 70. Each of the mobile device display 64, the mobile device camera 66, the mobile device communication system 68, and the mobile device sensors 70 are in electrical communication with the mobile device controller 62.

The mobile device controller 62 controls the operation of the mobile device 60. The mobile device controller 62 includes at least one mobile device processor 72 and a mobile device non-transitory computer readable storage device or mobile device media 74. In a non-limiting example, the mobile device processor 72 and mobile device media 74 of the mobile device controller 62 are similar in structure and/or function to the processor 22 and the media 24 of the vehicle controller 14, as described above.

The mobile device display 64 is used to display information to the occupant. The mobile device display 64 is capable of displaying text, graphics, and/or images. It should be understood that the mobile device display 64 may include an LCD display, LED display, and/or the like without departing from the scope of the present disclosure.

The mobile device camera 66 is used to capture images of an environment surrounding the mobile device 60. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The mobile device communication system 68 allows the mobile device controller 62 to communicate with remote systems. In an exemplary embodiment, the mobile device communication system 68 includes a wireless communication system configured to communicate using wireless networks such as a wireless local area network (WLAN) (e.g., using IEEE 802.11 standards), radio frequency identification (RFID), dedicated short-range communication (DSRC), near-field communication (NFC), personal area network communication (e.g., BLUETOOTH), and/or cellular data communication (e.g., using GSMA standards, such as, for example, SGP.02, SGP.22, SGP.32, and the like). Accordingly, in a non-limiting example, the mobile device communication system 68 includes one or more antennas and/or communication transceivers for transmitting and/or receiving signals.

In a non-limiting example, the mobile device 60 uses the mobile device communication system 68 to act as the configuring device for the toll transponder device 18.

In another non-limiting example, the mobile device controller 62 is configured to execute an application (hereinafter referred to as a toll management application) which allows a user (e.g., the occupant) to manage and configure a toll account. In the scope of the present disclosure, a toll account is a service provided by a toll operator which allows users to electronically pay tolls and configure toll preferences. In order to utilize the toll account to pay tolls, the user registers the toll account by linking the vehicle 12 to the toll account and providing a payment method. In a non-limiting example, the toll account is linked to the vehicle 12 using, for example, a license plate number of the vehicle 12 and/or a unique identifier (e.g., a serial number) of the toll transponder device 18. Thus, in the scope of the present disclosure, a toll account registration status is considered to be a toll account registered status if the toll account is set up and ready to be used to pay tolls (e.g., if user has linked the vehicle 12 and provided a payment method). The toll account registration status is considered to be a toll account unregistered status if the toll account is not configured, misconfigured, nonexistent, or otherwise not ready to be used to pay tolls.

The toll management application executed by the mobile device controller 62 is further configured to allow the user to provide occupant toll preferences. In the scope of the present disclosure, occupant toll preferences are used to determine if/when the toll account is authorized to be used to pay for tolls. For example, the occupant toll preferences may include allowing only tolls costing less than a predetermined threshold, within a certain geographical area, at certain times of the day, under certain traffic conditions, and/or the like. More generally, the occupant toll preferences also allow the toll account to be disabled such that no tolls are authorized. In the scope of the present disclosure, the occupant toll preference is a positive occupant toll preference if tolls are allowed under any circumstances. The occupant toll preference is a negative occupant toll preference if tolls are disallowed under all circumstances.

The toll management application executed by the mobile device controller 62 is further configured to transmit the toll account registration status and the occupant toll preference to the vehicle communication system 32 using the mobile device communication system 68. It should be understood that the preceding discussion of the toll management application is merely exemplary in nature, and that any hardware and/or software component of the mobile device 60 suitable to provide information about toll account status, toll eligibility, toll preferences, and/or the like to the vehicle controller 14 is within the scope of the present disclosure.

The mobile device sensors 70 are used to monitor the environment surrounding the mobile device 60. In an exemplary embodiment, the mobile device sensors 70 include motion sensors, such as, for example, an accelerometer, a gyroscope, a magnetometer, and the like.

Figure 2:
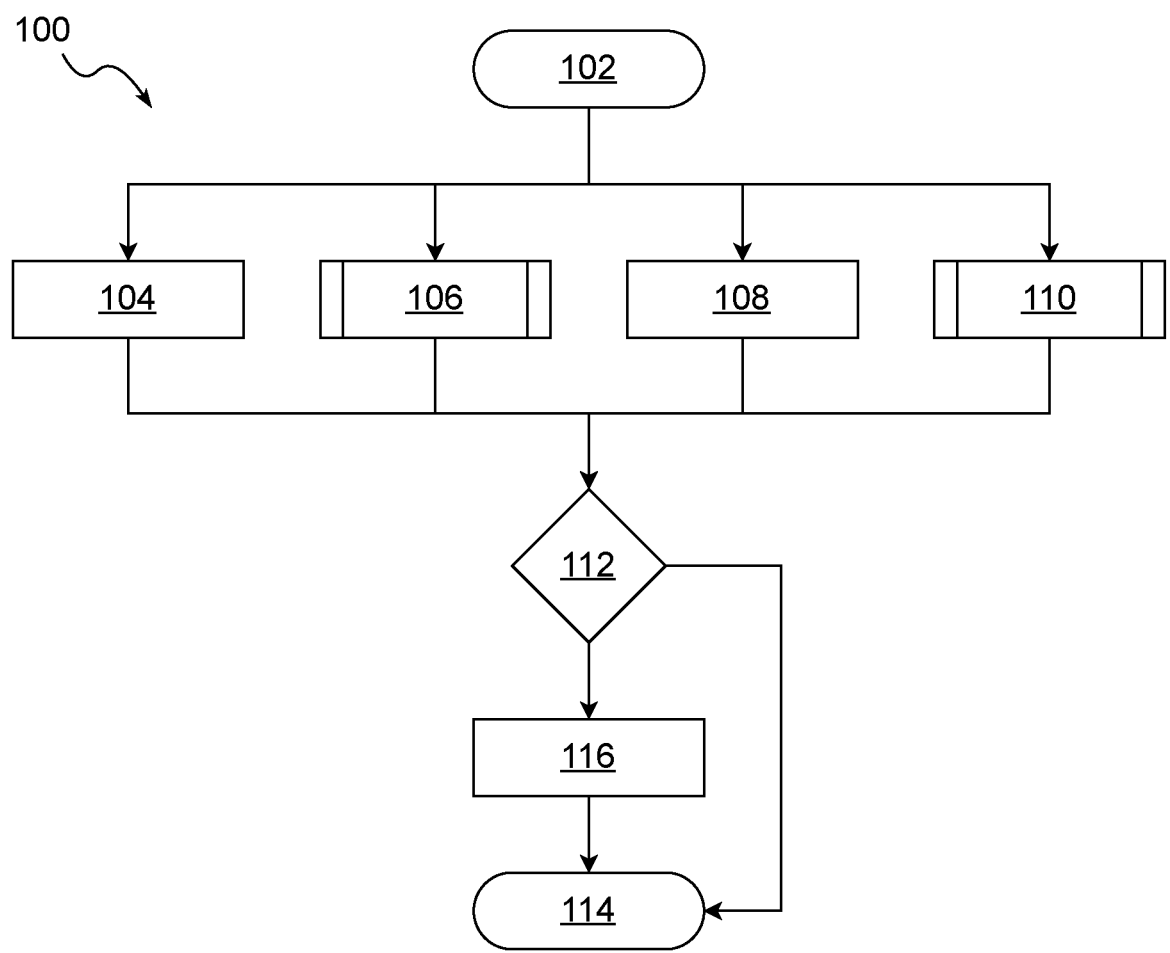
FIG. 2 is a flowchart of a method for initiating automated path planning into the protected lane for the vehicle, according to an exemplary embodiment.

Referring to FIG. 2, a flowchart of a method 100 for initiating automated path planning into a protected lane for a vehicle is shown. The method 100 begins at block 102 and proceeds to blocks 104, 106, 108, and 110. At block 104, the vehicle controller 14 determines a restriction status of a protected lane in an environment surrounding the vehicle 12. In the scope of the present disclosure, a protected lane is a designated roadway segment reserved for specific types of vehicles or modes of transportation. In a non-limiting example, the protected lane may be designated for use by public transit vehicles, emergency vehicles, bicycles, pedestrians, high occupancy vehicles (HOVs), electric vehicles, passenger vehicles only, trucks only, only during certain time periods, only during certain traffic conditions, and/or the like. In another non-limiting example, protected lanes may also require payment of tolls for use. Physical barriers, such as concrete curbs, bollards, or painted buffer zones, help to prevent encroachment from other vehicles and ensure the uninterrupted flow of traffic within the lane protected lane. Additionally, protected lane status indicators may be used to indicate the restriction status of the protected lane. In a non-limiting example, the protected lane status indicators include physical and/or electronic signage, painted and/or textured road markings, electronic data stored in a map database (e.g., a local map database on the media 24 of the vehicle controller 14 and/or a remote map database stored on a remote server), and/or the like.

In the scope of the present disclosure, the restriction status described a permitted use of the protected lane. For example, the restriction status may include "passenger vehicles only", "high occupancy vehicles only", "electric vehicles only", "no trucks", "between six and eight AM only", and/or the like. In the scope of the present disclosure, a high occupancy vehicle (HOV) is a vehicle having greater than or equal to a predetermined HOV threshold of occupants (e.g., two occupants).

To determine the restriction status of the protected lane, the vehicle controller 14 interprets protected lane status indicators. In an exemplary embodiment, to determine the restriction status of the protected lane, the vehicle controller 14 uses the vehicle camera 38 to capture an image of a protected lane status indicator. The vehicle controller 14 subsequently uses a computer vision algorithm to determine the restriction status of the protected lane based at least in part on the image. In an exemplary embodiment, the computer vision algorithm utilizes machine learning techniques to analyze pixel-level information of an input image to detect and classify objects or patterns of interest. In a non-limiting example, the computer vision algorithm begins by preprocessing the input image through techniques such as, for example, image resizing, normalization, and/or filtering to reduce noise. Subsequently, the computer vision algorithm extracts relevant features from the input image using methods such as, for example, edge detection, corner detection, texture analysis, and/or the like. The computer vision algorithm may then utilize a machine learning model, such as, for example, a convolutional neural network (CNN), to classify and label relevant features (i.e., the protected lane status indicator) of the input image based on learned patterns and associations.

In another exemplary embodiment, to determine the restriction status of the protected lane, the vehicle controller 14 retrieves the restriction status from the media 24 of the vehicle controller 14 and/or utilizes the vehicle communication system 32 to retrieve the restriction status from a remote system. After block 104, the method 100 proceeds to block 112, as will be discussed in greater detail below.

At block 106, the vehicle controller 14 determines an occupancy status of the vehicle 12. In the scope of the present disclosure, the occupancy status includes one of: a high occupancy status and a low occupancy status. The high occupancy status indicates that the vehicle 12 has greater than or equal to the predetermined HOV threshold of occupants. The low occupancy status indicates that the vehicle 12 has less than the predetermined HOV threshold of occupants. Determination of the occupancy status of the vehicle 12 will be discussed in greater detail below. After block 106, the method 100 proceeds to block 112, as will be discussed in greater detail below.

At block 108, the vehicle controller 14 determines a towing status of the vehicle 12. In the scope of the present disclosure, the towing status of the vehicle 12 indicates whether the vehicle 12 is currently towing a trailer. The towing status includes one of: an active towing status and an inactive towing status. The active towing status indicates that the vehicle 12 is towing a trailer. The inactive towing status indicates that the vehicle 12 is not towing a trailer. In an exemplary embodiment, to determine the towing status, the vehicle controller 14 determines the connection status of the vehicle trailer connector 36, as discussed above. If the connection status is the trailer connected status, the towing status is determined to be the active towing status. If the connection status is the trailer disconnected status, the towing status is determined to be the inactive towing status. In another exemplary embodiment, the vehicle controller 14 uses a mechanical strain gauge to detect a weight of a connected trailer. After block 108, the method 100 proceeds to block 112, as will be discussed in greater detail below.

At block 110, the vehicle controller 14 determines a toll status of the vehicle 12. In the scope of the present disclosure, the toll status indicates whether the vehicle 12 is permitted to enter a protected lane requiring payment of a toll. The toll status includes one of: a toll approved status and a toll denied status. The toll approved status indicates that the vehicle 12 is permitted to enter a protected lane requiring payment of a toll. The toll denied status indicates that the vehicle 12 is not permitted to enter a protected lane requiring payment of a toll. Determination of the toll status will be discussed in greater detail below. After block 110, the method 100 proceeds to block 112.

At block 112, the vehicle controller 14 determines whether automated path planning into the protected lane is permitted. In an exemplary embodiment, the vehicle controller 14 compares the restriction status of the protected lane determined at block 104 to the occupancy status of the vehicle 12 determined at block 106, the towing status of the vehicle 12 determined at block 108, and the toll status of the vehicle 12 determined at block 110. The vehicle controller 14 determines whether the occupancy status of the vehicle 12 determined at block 106, the towing status of the vehicle 12 determined at block 108, and the toll status of the vehicle 12 determined at block 110 satisfy the restriction status of the protected lane determined at block 104.

In the scope of the present disclosure, "satisfy the restriction status" means that each requirement of the restriction status is fulfilled by the vehicle 12. For example, if the restriction status of the protected lane includes "high occupancy only, no towing allowed, toll required", then the restriction status of the protected lane would be satisfied if the occupancy status is determined to be the high occupancy status at block 106, the towing status is determined to be the towing inactive status at block 108, and the toll status is determined to be the toll approved status at block 110. It should be understood that the aforementioned example is provided for purposes of illustration only.

In an exemplary embodiment, the vehicle controller 14 uses a machine learning algorithm, including, for example, a natural language processing (NLP) algorithm, to process and interpret the restriction status of the protected lane and/or compare the restriction status of the protected lane to the occupancy, towing, and toll status of the vehicle 12. In another exemplary embodiment, the vehicle controller 14 uses a deterministic method, including, for example, Boolean logic, conditional logic, a lookup table (LUT), deterministic NLP techniques, and/or the like, to process and interpret the restriction status of the protected lane and/or compare the restriction status of the protected lane to the occupancy status, towing, and toll status of the vehicle 12. It should be understood that additional methods and algorithms for processing and interpreting the restriction status of the protected lane and comparing the restriction status of the protected lane to the occupancy status, towing, and toll status of the vehicle 12 are within the scope of the present disclosure.

At block 112, if the occupancy status of the vehicle 12 determined at block 106, the towing status of the vehicle 12 determined at block 108, and the toll status of the vehicle 12 determined at block 110 do not satisfy the restriction status of the protected lane determined at block 104, the method 100 proceeds to enter a standby state at block 114. If the occupancy status of the vehicle 12 determined at block 106, the towing status of the vehicle 12 determined at block 108, and the toll status of the vehicle 12 determined at block 110 do satisfy the restriction status of the protected lane determined at block 104, the method 100 proceeds to block 116.

At block 116, the vehicle controller 14 calculates an automated vehicle path including the protected lane. In an exemplary embodiment, the automated vehicle path is calculated using the automated driving system 20. As discussed above, the automated driving system 20 uses the path planning algorithm to generate a sequence of waypoints or a continuous path that the vehicle 12 should follow to reach a destination. In a non-limiting example, the vehicle controller 14 provides a signal to the automated driving system 20 indicating that the protected lane is available for path planning. For example, the vehicle controller 14 may modify the route characteristic restrictions of the path planning algorithm to allow and/or include the protected lane during path planning. It should be understood that the aforementioned methods for calculating an automated vehicle path including the protected lane are merely exemplary in nature, and that any method which results in consideration of the protected lane by the automated driving system 20 for path planning is within the scope of the present disclosure. After block 116, the method proceeds to enter the standby state at block 114.

In an exemplary embodiment, the vehicle controller 14 repeatedly exits the standby state 114 and restarts the method 100 at block 102. In a non-limiting example, the vehicle controller 14 exits the standby state 114 and restarts the method 100 on a timer, for example, every three hundred milliseconds.

Figure 3:
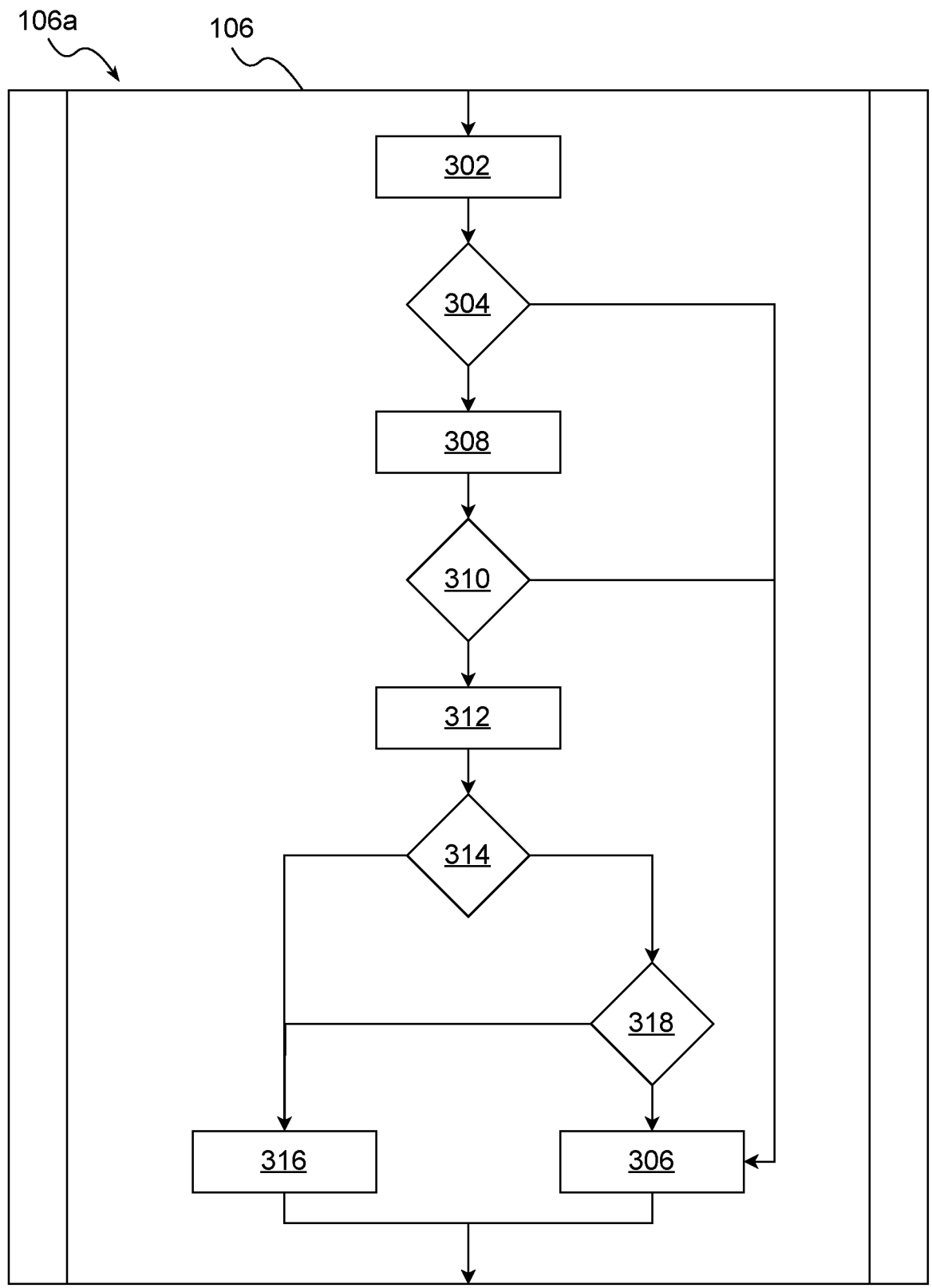
FIG. 3 is a flowchart of a method for determining an occupancy status of the vehicle, according to an exemplary embodiment.

Referring to FIG. 3, a flowchart of an exemplary embodiment 106a of block 106 (i.e., a method for determining the occupancy status of the vehicle 12) is shown. The exemplary embodiment 106a begins at block 302. At block 302, the vehicle controller 14 uses the seat belt sensor 44 to perform a seat belt sensor measurement to determine the engagement status (i.e., the engaged status or the disengaged status) of each of a plurality of seat belts (not shown) of the vehicle 12. After block 302, the exemplary embodiment 106a proceeds to block 304.

At block 304, the vehicle controller 14 determines a quantity of seat belts having the engaged status (i.e., a quantity of seat belts engaged) based on the seat belt measurement performed at block 302. If the quantity of seat belts having the engaged status is less than a predetermined seat belt threshold (e.g., two), the exemplary embodiment 106a proceeds to block 306, as will be discussed in greater detail below. In a non-limiting example, the predetermined seat belt threshold is equal to the predetermined HOV threshold discussed above. If the quantity of seat belts having the engaged status is greater than or equal to the predetermined seat belt threshold, the exemplary embodiment 106a proceeds to block 308.

At block 308, the vehicle controller 14 uses the seat weight sensor 46 to perform a seat weight sensor measurement. In an exemplary embodiment, the seat weight sensor measurement includes a weight detected on each of the plurality of seats of the vehicle 12. After block 308, the exemplary embodiment 106a proceeds to block 310.

At block 310, the vehicle controller 14 determines a quantity of occupied seats based at least in part on the seat weight sensor measurement performed at block 308. In an exemplary embodiment, each seat is considered to be occupied if the weight detected on the seat is greater than or equal to a predetermined weight threshold (e.g., ten kilograms). If the quantity of occupied seats is not equal to the quantity of seat belts engaged determined at block 304, the exemplary embodiment 106a proceeds to block 306, as will be discussed in greater detail below. If the quantity of occupied seats is equal to the quantity of seat belts engaged determined at block 304, the exemplary embodiment 106a proceeds to block 312.

At block 312, the vehicle controller 14 uses the door sensor 48 to perform a plurality of door sensor measurements for each of the plurality of doors of the vehicle 12. As discussed above, each of the plurality of door sensor measurements determines a registered position of a door. The registered positions are recorded in the media 24. After block 312, the exemplary embodiment 106a proceeds to block 314.

At block 314, the vehicle controller 14 determines a quantity of door opening events within a predetermined time period. As discussed above, a door opening event includes a door of the vehicle 12 being opened and subsequently closed. In a non-limiting example, the predetermined time period is a period between last key-off of the vehicle 12 and most recent key-on of the vehicle 12. In an exemplary embodiment, to determine the quantity of door opening events, the vehicle controller 14 analyzes the registered positions stored in the media 24 at block 312. In a non-limiting example, each time any door of the vehicle 12 is opened and subsequently closed within the predetermined time period, a door opening event is counted. If the quantity of door opening events is equal to the quantity of occupied seats determined at block 310 and the quantity of seat belts engaged determined at block 304, the exemplary embodiment 106a proceeds to block 316, as will be discussed in greater detail below. If the quantity of door opening events is not equal to the quantity of occupied seats determined at block 310 and the quantity of seat belts engaged determined at block 304, the exemplary embodiment 106a proceeds to block 318.

At block 318, the vehicle controller 14 requests an occupant response from the occupant. In an exemplary embodiment, the vehicle controller 14 prompts the occupant by providing a notification to the occupant using a display or infotainment system (not shown) of the vehicle 12. In another exemplary embodiment, the vehicle controller 14 uses the vehicle communication system 32 to transmit a message to the mobile device 60, and the mobile device controller 62 uses the mobile device display 64 to provide a notification to the occupant. In a non-limiting example, the notification includes a request such as, for example, "Please input the number of occupants in the vehicle". The occupant response may include a number indicating the number of occupants in the vehicle 12. In a non-limiting example, the occupant may provide the occupant response using a touch interface, a voice command interface, a gesture-based interface, and/or the like. It should be understood that the aforementioned request and occupant response are merely exemplary in nature, and that additional requests and occupant responses are within the scope of the present disclosure.

If the occupant response indicates that the quantity of occupants in the vehicle 12 is greater than or equal to the predetermined seat belt threshold, the exemplary embodiment 106a proceeds to block 316, as will be discussed in greater detail below. If the occupant response indicates that the quantity of occupants in the vehicle 12 is less than the predetermined seat belt threshold, the exemplary embodiment 106a proceeds to block 306.

At block 306, the occupancy status of the vehicle 12 is determined to be the low occupancy status. After block 306, the exemplary embodiment 106a is concluded, and the method 100 proceeds as discussed above.

At block 316, the occupancy status of the vehicle 12 is determined to be the high occupancy status. After block 316, the exemplary embodiment 106a is concluded, and the method 100 proceeds as discussed above.

Figure 4:
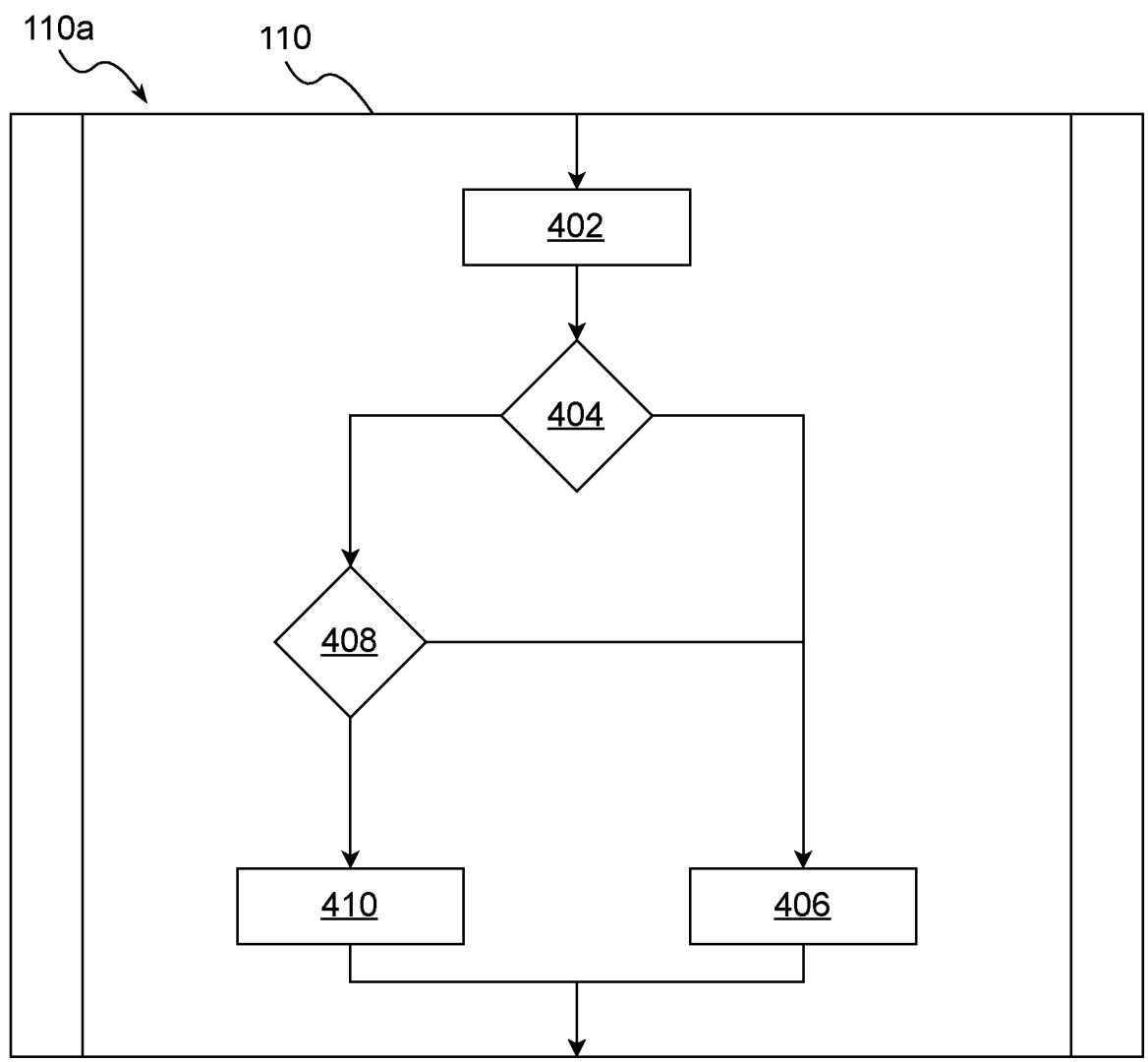
FIG. 4 is a flowchart of a first method for determining a toll status of the vehicle, according to an exemplary embodiment.

Referring to FIG. 4, a flowchart of a first exemplary embodiment 110a of block 110 (i.e., a first method for determining the toll status of the vehicle 12) is shown. The first exemplary embodiment 110a begins at block 402. At block 402, the vehicle controller 14 uses the vehicle communication system 32 to establish a connection to the mobile device 60 (i.e., using the mobile device communication system 68). In a non-limiting example, as discussed above, the connection to the mobile device 60 is established using WLAN, NFC, BLUETOOTH, and/or the like. After block 402, the first exemplary embodiment 110a proceeds to block 404.

At block 404, the vehicle controller 14 determines the toll account registration status. The toll account registration status is discussed in greater detail above. In an exemplary embodiment, the vehicle controller 14 communicates with the mobile device 60 using the connection to the mobile device 60 established at block 402. In a non-limiting example, the vehicle controller 14 prompts the toll management application executed on the mobile device controller 62 to provide the vehicle controller 14 with the toll account registration status. If the toll account registration status is determined to be the toll account unregistered status, the first exemplary embodiment 110a proceeds to block 406, as will be discussed in greater detail below. If the toll account registration status is determined to be the toll account registered status, the first exemplary embodiment 110a proceeds to block 408.

At block 408, the vehicle controller 14 determines the occupant toll preference. The occupant toll preference is discussed in greater detail above. In an exemplary embodiment, the vehicle controller 14 communicates with the mobile device 60 using the connection to the mobile device 60 established at block 402. In a non-limiting example, the vehicle controller 14 prompts the toll management application executed on the mobile device controller 62 to provide the vehicle controller 14 with the occupant toll preference. If the occupant toll preference is determined to be the negative occupant toll preference, the first exemplary embodiment 110a proceeds to block 406, as will be discussed in greater detail below. If the occupant toll preference is determined to be the positive occupant toll preference, the first exemplary embodiment 110a proceeds to block 410.

At block 410, the toll status is determined to be the toll approved status. After block 410, the first exemplary embodiment 110a is concluded, and the method 100 proceeds as discussed above.

At block 406, the toll status is determined to be the toll denied status. After block 406, the first exemplary embodiment 110a is concluded, and the method 100 proceeds as discussed above.

Figure 5:
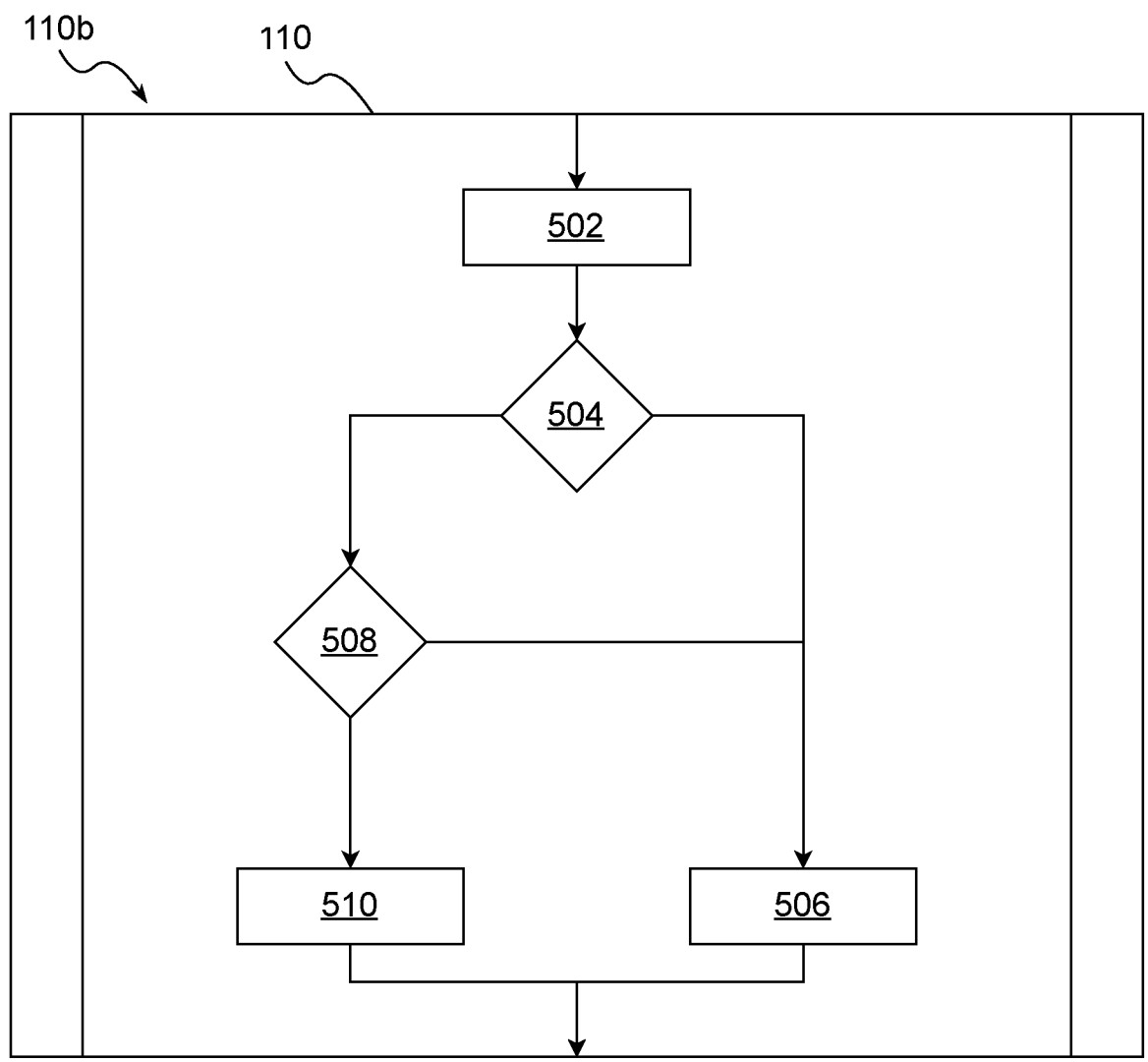
FIG. 5 is a flowchart of a second method for determining the toll status of the vehicle, according to an exemplary embodiment.

Referring to FIG. 5, a flowchart of a second exemplary embodiment 110b of block 110 (i.e., a second method for determining the toll status of the vehicle 12) is shown. The second exemplary embodiment 110b begins at block 502. At block 502, the vehicle controller 14 uses the vehicle communication system 32 to establish a connection to the toll transponder device 18. In a non-limiting example, as discussed above, the connection to the toll transponder device 18 is established using WLAN, NFC, BLUETOOTH, and/or the like. After block 502, the second exemplary embodiment 110b proceeds to block 504.

At block 504, the vehicle controller 14 determines the toll account registration status. The toll account registration status is discussed in greater detail above. In an exemplary embodiment, the vehicle controller 14 communicates with the mobile device 60 using the connection to the mobile device 60 established at block 502. In a non-limiting example, the vehicle controller 14 prompts the microcontroller of the toll transponder device 18 to provide the vehicle controller 14 with the toll account registration status. If the toll account registration status is determined to be the toll account unregistered status, the second exemplary embodiment 110b proceeds to block 506, as will be discussed in greater detail below. If the toll account registration status is determined to be the toll account registered status, the second exemplary embodiment 110b proceeds to block 508.

At block 508, the vehicle controller 14 determines the occupant toll preference. The occupant toll preference is discussed in greater detail above. In an exemplary embodiment, the vehicle controller 14 communicates with the mobile device 60 using the connection to the mobile device 60 established at block 502. In a non-limiting example, the vehicle controller 14 prompts the microcontroller of the toll transponder device 18 to provide the vehicle controller 14 with the occupant toll preference. If the occupant toll preference is determined to be the negative occupant toll preference, the second exemplary embodiment 110b proceeds to block 506, as will be discussed in greater detail below. If the occupant toll preference is determined to be the positive occupant toll preference, the second exemplary embodiment 110b proceeds to block 510.

At block 510, the toll status is determined to be the toll approved status. After block 510, the second exemplary embodiment 110b is concluded, and the method 100 proceeds as discussed above.

At block 506, the toll status is determined to be the toll denied status. After block 506, the second exemplary embodiment 110b is concluded, and the method 100 proceeds as discussed above.

The system 10 and method 100 of the present disclosure offer several advantages. The system 10 and method 100 are used to automatically detect the restriction status of protected lanes, increasing occupant convenience. The method 100 allows robust and accurate determination of whether the vehicle satisfies the restriction status of a protected lane, including robust determination of occupancy, towing status, and toll status. Direct communication between the vehicle controller 14 and the mobile device 60 and/or the toll transponder device 18 allows for determination of toll status information without occupant interaction. Use of protected lanes may allow improved navigation routing, increasing efficiency and/or reducing travel time.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for initiating automated path planning into a protected lane for a vehicle, the method comprising:
   determining a restriction status of the protected lane;
   determining an occupancy status of the vehicle;
   determining a towing status of the vehicle;

determining a toll status of the vehicle; and initiating automated path planning into the protected lane based at least in part on the restriction status of the protected lane, the occupancy status of the vehicle, the towing status of the vehicle, and the toll status of the vehicle.

2. The method of claim 1, wherein determining the restriction status of the protected lane further comprises:

capturing an image of a protected lane status indicator using a vehicle camera; and determining the restriction status of the protected lane based at least in part on the image.

3. The method of claim 1, wherein determining the occupancy status of the vehicle further comprises:

determining the occupancy status of the vehicle based at least in part on at least one of: a seat belt sensor measurement, a seat weight sensor measurement, and a door sensor measurement, wherein the occupancy status includes one of: a high occupancy status and a low occupancy status.

4. The method of claim 3, wherein determining the occupancy status of the vehicle further comprises:

performing the seat belt sensor measurement;

determining a quantity of seat belts engaged based at least in part on the seat belt sensor measurement; and determining the occupancy status to be the low occupancy status in response to determining that the quantity of seat belts engaged is less than a predetermined seat belt threshold.

5. The method of claim 4, wherein determining the occupancy status of the vehicle further comprises:

performing the seat weight sensor measurement in response to determining that the quantity of seat belts engaged is greater than or equal to the predetermined seat belt threshold;

determining a quantity of occupied seats based at least in part on the seat weight sensor measurement; and determining the occupancy status to be the low occupancy status in response to determining that the quantity of seat belts engaged is not equal to the quantity of occupied seats.

6. The method of claim 5, wherein determining the occupancy status of the vehicle further comprises:

performing the door sensor measurement in response to determining that the quantity of seat belts engaged is greater than or equal to the predetermined seat belt threshold and that the quantity of seat belts engaged is equal to the quantity of occupied seats;

determining a quantity of door opening events based at least in part on the door sensor measurement;

requesting an occupant response in response to determining that the quantity of seat belts engaged is not equal to the quantity of occupied seats and the quantity of door opening events;

determining the occupancy status based at least in part on the occupant response; and determining the occupancy status to be the high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

7. The method of claim 1, wherein determining the towing status of the vehicle further comprises:

determining a connection status of a vehicle trailer connector, wherein the connection status includes one of: a trailer connected status and a trailer disconnected status;

determining the towing status to be an active towing status in response to determining that the connection status is the trailer connected status; and determining the towing status to be an inactive towing status in response to determining that the connection status is the trailer disconnected status.

8. The method of claim 1, wherein determining the toll status of the vehicle further comprises:

establishing a connection to a mobile device;

determining a toll account registration status using the connection to the mobile device, wherein the toll account registration status includes one of: a toll account registered status and a toll account unregistered status; and determining the toll status to be a toll denied status in response to determining that the toll account registration status is the toll account unregistered status.

9. The method of claim 8, wherein determining the toll status of the vehicle further comprises:

determining an occupant toll preference using the connection to the mobile device in response to determining that the toll account registration status is the toll account registered status, wherein the occupant toll preference includes one of: a negative occupant toll preference and a positive occupant toll preference;

determining the toll status to be the toll denied status in response to determining that the occupant toll preference is the negative occupant toll preference; and determining the toll status to be a toll approved status in response to determining that the occupant toll preference is the positive occupant toll preference.

10. The method of claim 1, wherein determining the toll status of the vehicle further comprises:

establishing a connection to a toll transponder device;

determining a toll account registration status using the connection to the toll transponder device, wherein the toll account registration status includes one of: a toll account registered status and a toll account unregistered status;

determining the toll status to be a toll denied status in response to determining that the toll account registration status is the toll account unregistered status; and determining the toll status to be a toll approved status in response to determining that the toll account registration status is the toll account registered status.

11. A system for initiating automated path planning into a protected lane for a vehicle, the system comprising:

a perception sensor;

an occupancy sensor including a seat belt sensor and a seat weight sensor;

an automated driving system;

a vehicle communication system; and a vehicle controller in electrical communication with the perception sensor, the occupancy sensor, the automated driving system, and the vehicle communication system, wherein the vehicle controller is programmed to:

determine a restriction status of the protected lane using the perception sensor;

determine an occupancy status of the vehicle using the occupancy sensor, wherein to determine the occupancy status of the vehicle, the vehicle controller is further programmed to:

perform a seat belt sensor measurement using the seat belt sensor, wherein the seat belt sensor measurement includes an engagement status of each of a plurality of seat belts of the vehicle;

determine a quantity of seat belts engaged based at least in part on the engagement status of each of the plurality of seat belts of the vehicle;

determine the occupancy status to be a low occupancy status in response to determining that the quantity of seat belts engaged is less than a predetermined seat belt threshold;

perform a seat weight sensor measurement using the seat weight sensor in response to determining that the quantity of seat belts engaged is greater than or equal to the predetermined seat belt threshold;

determine a quantity of occupied seats based at least in part on the seat weight sensor measurement; and determine the occupancy status to be the low occupancy status in response to determining that the quantity of seat belts engaged is not equal to the quantity of occupied seats;

determine a toll status of the vehicle using the vehicle communication system; and initiate automated path planning into the protected lane using the automated driving system based at least in part on the restriction status of the protected lane, the occupancy status of the vehicle, and the toll status of the vehicle.

12. The system of claim 11, wherein the perception sensor further comprises a vehicle camera, and wherein to determine a restriction status of the protected lane, the vehicle controller is further programmed to:

capture an image of a protected lane status indicator using the vehicle camera; and determine the restriction status of the protected lane based at least in part on the image.

13. The system of claim 11, wherein the occupancy sensor further comprises a door sensor, and wherein to determine the occupancy status of the vehicle, the vehicle controller is further programmed to:

perform a door sensor measurement using the door sensor in response to determining that the quantity of seat belts engaged is greater than or equal to the predetermined seat belt threshold and that the quantity of seat belts engaged is equal to the quantity of occupied seats;

determine a quantity of door opening events based at least in part on the door sensor measurement;

request an occupant response in response to determining that the quantity of seat belts engaged is not equal to the quantity of occupied seats and the quantity of door opening events;

determine the occupancy status based at least in part on the occupant response; and determine the occupancy status to be a high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

14. The system of claim 11, wherein to determine the toll status of the vehicle, the vehicle controller is further programmed to:

establish a connection to a mobile device using the vehicle communication system;

determine a toll account registration status using the connection to the mobile device, wherein the toll account registration status includes one of: a toll account registered status and a toll account unregistered status;

determine the toll status to be a toll denied status in response to determining that the toll account registration status is the toll account unregistered status;

determine an occupant toll preference using the connection to the mobile device in response to determining that the toll account registration status is the toll account registered status, wherein the occupant toll preference includes one of: a negative occupant toll preference and a positive occupant toll preference;

determine the toll status to be the toll denied status in response to determining that the occupant toll preference is the negative occupant toll preference; and determine the toll status to be a toll approved status in response to determining that the occupant toll preference is the positive occupant toll preference.

15. The system of claim 11, wherein to initiate automated path planning into the protected lane, the vehicle controller is further configured to:

compare the restriction status of the protected lane to the occupancy status of the vehicle and the toll status of the vehicle; and calculate an automated vehicle path including the protected lane using the automated driving system in response to determining that the occupancy status of the vehicle and the toll status of the vehicle satisfy the restriction status of the protected lane.

16. The system of claim 11, wherein to determine the toll status of the vehicle, the vehicle controller is further programmed to:

establish a connection to a toll transponder device;

determine a toll account registration status using the connection to the toll transponder device, wherein the toll account registration status includes one of: a toll account registered status and a toll account unregistered status;

determine the toll status to be a toll denied status in response to determining that the toll account registration status is the toll account unregistered status; and determine the toll status to be a toll approved status in response to determining that the toll account registration status is the toll account registered status.

17. The system of claim 11, wherein to initiate automated path planning into the protected lane, the vehicle controller is further configured to:

determine a towing status of the vehicle based at least in part on a connection status of a vehicle trailer connector, wherein the connection status includes one of: a trailer connected status and a trailer disconnected status; and initiate automated path planning into the protected lane using the automated driving system based at least in part on the restriction status of the protected lane, the occupancy status of the vehicle, the towing status of the vehicle, and the toll status of the vehicle.

18. A method for initiating automated path planning into a protected lane for a vehicle, the method comprising:

capturing an image of a protected lane status indicator using a vehicle camera; and determining a restriction status of the protected lane based at least in part on the image;

determining an occupancy status of the vehicle based at least in part on at least one of: a seat belt sensor measurement, a seat weight sensor measurement, and a door sensor measurement, wherein the occupancy status includes one of: a high occupancy status and a low occupancy status;

determining a towing status of the vehicle based at least in part on a connection status of a vehicle trailer connector, wherein the connection status includes one of: a trailer connected status and a trailer disconnected status;

determining a toll status of the vehicle based at least in part on a connection to at least one of: a mobile device and a toll transponder device, wherein the toll status includes one of: a toll approved status and a toll denied status; and comparing the restriction status of the protected lane to the occupancy status of the vehicle, the towing status of the vehicle, and the toll status of the vehicle; and calculating an automated vehicle path including the protected lane in response to determining that the occupancy status of the vehicle, the towing status of the vehicle, and the toll status of the vehicle satisfy the restriction status of the protected lane.

19. The method of claim 18, wherein determining the occupancy status of the vehicle further comprises:

performing the seat belt sensor measurement;

determining a quantity of seat belts engaged based at least in part on the seat belt sensor measurement;

determining the occupancy status to be the low occupancy status in response to determining that the quantity of seat belts engaged is less than a predetermined seat belt threshold;

performing the seat weight sensor measurement in response to determining that the quantity of seat belts engaged is greater than or equal to the predetermined seat belt threshold;

determining a quantity of occupied seats based at least in part on the seat weight sensor measurement; and determining the occupancy status to be the low occupancy status in response to determining that the quantity of seat belts engaged is not equal to the quantity of occupied seats.

20. The method of claim 19, wherein determining the occupancy status of the vehicle further comprises:

performing the door sensor measurement in response to determining that the quantity of seat belts engaged is greater than or equal to the predetermined seat belt threshold and that the quantity of seat belts engaged is equal to the quantity of occupied seats;

determining a quantity of door opening events based at least in part on the door sensor measurement;

requesting an occupant response in response to determining that the quantity of seat belts engaged is not equal to the quantity of occupied seats and the quantity of door opening events;

determining the occupancy status based at least in part on the occupant response; and determining the occupancy status to be the high occupancy status in response to determining that the quantity of seat belts engaged is greater than or equal to the predetermined seat belt threshold, that the quantity of seat belts engaged is equal to the quantity of occupied seats, and that the quantity of seat belts engaged is equal to the quantity of door opening events.

* * * * *